US012625955B2

(12) United States Patent  
Arbel et al.

(10) Patent No.: US 12,625,955 B2  
(45) Date of Patent: *May 12, 2026

(54) TECHNIQUES FOR REPRESENTATION OF REMEDIATION ACTION IN A CYBERSECURITY GRAPH DATABASE

(71) Applicant: Wiz, Inc., New York, NY (US)

(72) Inventors: Itay Arbel, Tel Aviv (IL); Mattan Shalev, Tel Aviv (IL); Yaniv Shaked, Tel Aviv (IL); Alon Schindel, Tel Aviv (IL); Ami Luttwak, Binyamina (IL); Roy Reznik, Tel Aviv (IL); Yinon Costica, Tel Aviv (IL); Eric Abramov, Holon (IL)

(73) Assignee: Wiz, Inc., New York, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/179,194

(22) Filed: Mar. 6, 2023

(65) Prior Publication Data

US 2024/0303329 A1 Sep. 12, 2024

(51) Int. Cl.  
 G06F 21/56 (2013.01)  
 G06F 21/55 (2013.01)  
 G06F 21/57 (2013.01)  
(52) U.S. Cl.  
 CPC ............ G06F 21/56 (2013.01); G06F 21/552 (2013.01); G06F 21/577 (2013.01)  
(58) Field of Classification Search  
 CPC ....... G06F 21/56; G06F 21/552; G06F 21/577  
 See application file for complete search history.

(56) References Cited

U.S. PATENT DOCUMENTS

| | | | |
|---|---|---|---|
| 11,539,749 B2 | 12/2022 | Canzanese, Jr. et al. | |
| 2017/0289187 A1* | 10/2017 | Noel ...................... | H04L 67/12 |
| 2020/0042363 A1 | 2/2020 | Selvaraj | |
| 2021/0099478 A1* | 4/2021 | Seetharamaiah ... | H04L 63/1433 |
| 2021/0232684 A1* | 7/2021 | Franco ................ | G06F 11/3476 |
| 2021/0303523 A1* | 9/2021 | Periyagaram ........... | G06F 16/13 |
| 2022/0255957 A1 | 8/2022 | Campbell et al. | |
| 2024/0013528 A1* | 1/2024 | Saliba .................. | G06V 10/955 |
| 2024/0283639 A1* | 8/2024 | Thompson ............ | H04L 9/3239 |
| 2024/0314169 A1* | 9/2024 | Azad ................... | H04L 63/1491 |

OTHER PUBLICATIONS

International Search Report for PCT/IB2024/052172, dated Apr. 30, 2024. Searching Authority, Israel Patent Office, Jerusalem, Israel. Written Opinion of the Searching Authority for PCT/IB2024/ 052172, dated Apr. 30, 2024. Searching Authority, Israel Patent Office, Jerusalem, Israel.

* cited by examiner

*Primary Examiner* — Linglan Edwards  
*Assistant Examiner* — Jacob Benedict Knackstedt  
(74) *Attorney, Agent, or Firm* — M&B IP Analysts, LLC

(57) ABSTRACT

A system and method for generating a compact representation of a computing environment having a remediated cybersecurity threat is disclosed. In an embodiment, the method includes generating an inspectable disk based on a disk of a resource in the computing environment; detecting a forensic artifact on the inspectable disk; traversing a security graph for a forensic finding based on the forensic artifact, wherein the security graph includes a representation of the computing environment; detecting a remediation node connected to a node representing the forensic finding; and initiating a remediation action, represented by the remediation node.

19 Claims, 8 Drawing Sheets

160

810

PROCESSING
CIRCUITRY

820

MEMORY

850

830

STORAGE

840

NETWORK
INTERFACE

TECHNIQUES FOR REPRESENTATION OF REMEDIATION ACTION IN A CYBERSECURITY GRAPH DATABASE

TECHNICAL FIELD

The present disclosure relates generally to digital forensics and specifically to performing forensic analysis in a cloud computing environment.

BACKGROUND

Cybersecurity is a field in computer science which is concerned with providing security to digital assets, managing digital identity and authorization, and the like. Digital assets are often defined within a network of computers, such as a cloud computing environment. Cloud computing environments, such as virtual private clouds (VPCs) are deployed on cloud computing infrastructures, such as Amazon® Web Service (AWS), Google® Cloud Platform (GCP), Microsoft® Azure, and the like.

Bad actors desire access to such assets, which can include provisioned hardware (allowing a bad actor to utilize cloud computing resources for nefarious purposes), sensitive data, and the like. While there are many solutions which attempt to curtail such penetrations, inevitably, some will succeed.

The field of digital forensics is concerned with detecting cybersecurity breaches. This is advantageous as it allows, on one hand, to ascertain what damage has been done to, or using, the digital assets, and on the other hand, one it is ascertained that damage has been done or is being done, such knowledge allows to initiate remediation actions.

Utilizing forensic software requires resources and is obstructive to the normal operation of a computing environment. For example, a disk which undergoes forensic analysis needs to devote access operations (e.g., read, write, etc.) to the forensic analysis software. This is an issue where a breach event is suspected, but not confirmed, as it can result in performing analysis on a disk which was not compromised, and yet resources had to be devoted to determine that.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a compact representation of a computing environment having a remediated cybersecurity threat. The method also includes generating an inspectable disk based on a disk of a resource in the computing environment; detecting a forensic artifact on the inspectable disk; traversing a security graph for a forensic finding based on the forensic artifact, where the security graph includes a representation of the computing environment; detecting a remediation node connected to a node representing the forensic finding; and initiating a remediation action, represented by the remediation node.

Certain embodiments disclosed herein also include a non-transitory computer readable medium having stored thereon instructions for causing a processing circuitry to execute a process. The non-transitory computer readable medium also includes generating an inspectable disk based on a disk of a resource in the computing environment; detecting a forensic artifact on the inspectable disk; traversing a security graph for a forensic finding based on the forensic artifact, where the security graph includes a representation of the computing environment; detecting a remediation node connected to a node representing the forensic finding; and initiating a remediation action, represented by the remediation node.

Certain embodiments disclosed herein also include a system for generating a compact representation of a computing environment having a remediated cybersecurity threat. The system also includes a processing circuitry. The system also includes a memory, the memory containing instructions that, when executed by the processing circuitry, configure the system to: generate an inspectable disk based on a disk of a resource in the computing environment; detect a forensic artifact on the inspectable disk; traverse a security graph for a forensic finding based on the forensic artifact, where the security graph includes a representation of the computing environment; detect a remediation node connected to a node representing the forensic finding; and initiate a remediation action, represented by the remediation node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
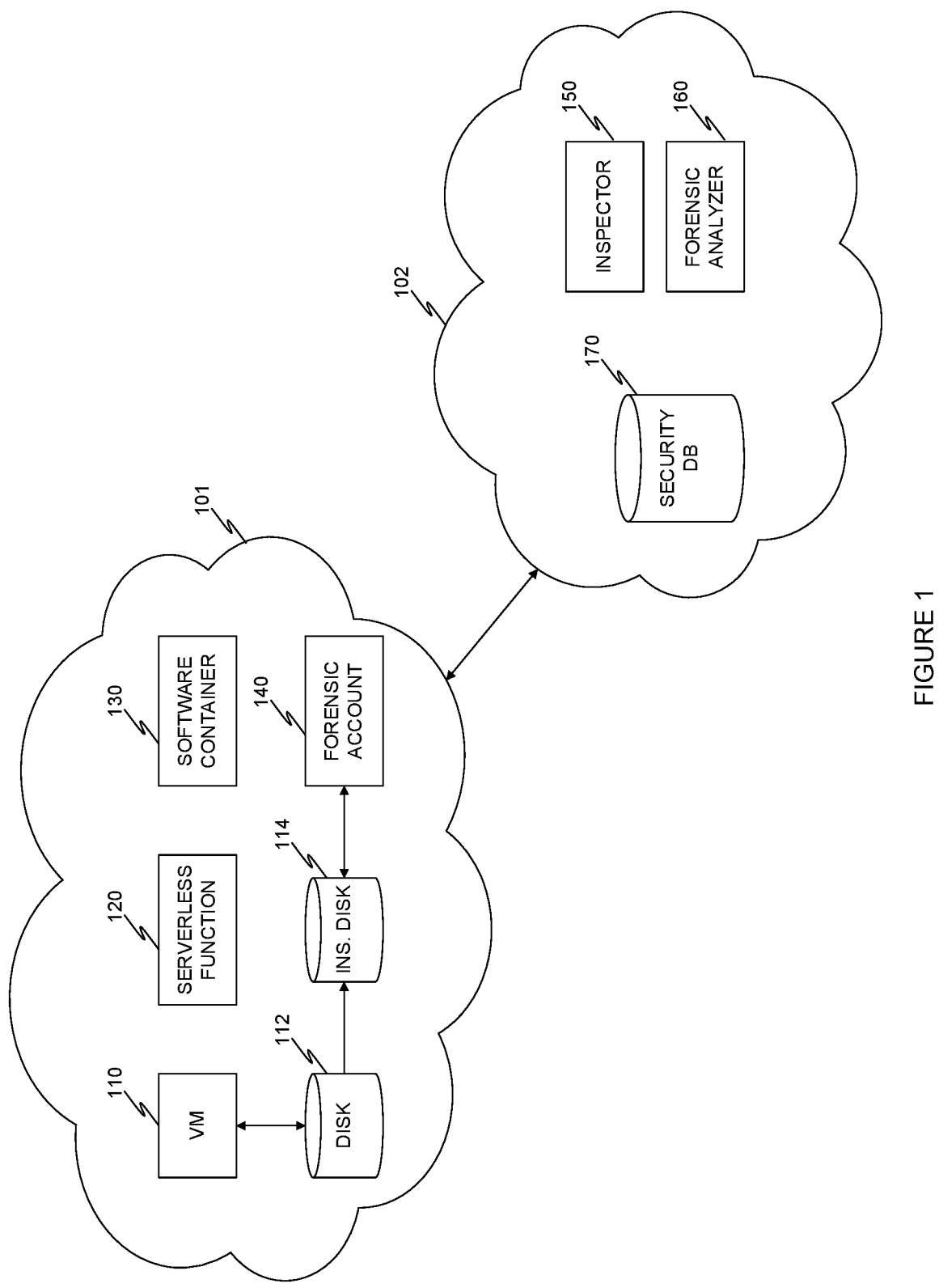
FIG. 1 is an example schematic diagram of a monitored computing environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for cybersecurity remediation in response to performing forensic analysis on a disk in a computing environment. In an embodiment, an inspectable disk is generated based on a disk deployed in a computing environment, such as a cloud computing environment. In some embodiments, the inspectable disk is mounted to a forensic analyzer, which is deployed as a resource having a software application configured to perform forensic analysis on the inspectable disk.

In some embodiments, a forensic account is a principal deployed in the computing environment which is provided access to the inspectable disk. The forensic account is utilized to perform the forensic analysis, and is assumed by, for example, an inspector, an inspection environment, a forensic analyzer, and the like. This allows for performing forensic analysis on the content of a disk (i.e., the inspectable disk), while the original disk is still deployed in the computing environment. Thus, the disk is not perturbed and can continue to function.

In certain embodiments, forensic artifacts are discovered on the inspectable disk, and a forensic finding is generated. In some embodiments, a remediation action is initiated in response to detecting the forensic artifact. In certain embodiments, the remediation action is initiated in the computing environment, for example on the resource which is associated with the disk, based on which the inspectable disk was generated. Thus, only if evidence of a cybersecurity breach, exploitation, and the like, is detected, then a remediation action is initiated. This allows the computing environment to devote predetermined resources to forensic analysis, which are provisioned on demand. Thus, if an inspectable disk is free of evidence of a cybersecurity breach, then operation of the disk itself is not perturbed, as it is the inspectable disk which is utilized for the forensic analysis, and not the disk itself.

In some embodiments, a forensic artifact is detected in a log of a computing environment. In certain embodiments, a resource, such as a serverless function, is configured to monitor a computing environment, and write records to a log. In an embodiment, each record includes data values which describe an event which occurred in the computing environment, such as a communication between devices, an access of a disk, an access of a bucket, granting a permission to a cloud entity, a combination thereof, and the like.

For example, in an embodiment, a forensic artifact is a record extracted from a log of a computing environment.

FIG. 1 is an example schematic diagram of a monitored computing environment, utilized to describe an embodiment. In an embodiment, a computing environment is a cloud computing environment, a networked computing environment, a local network computing environment, a combination thereof (e.g., a hybrid computing environment), and the like.

In some embodiments, a computing environment is deployed on a cloud computing infrastructure. For example, in an embodiment, the computing environment is a virtual private cloud (VPC), a Virtual Network (VNet), and the like, deployed on a cloud computing infrastructure, such as Amazon® Web Services (AWS), Google® Cloud Platform (GCP), Microsoft® Azure, and the like.

In an embodiment, a computing environment 101 is monitored by an inspection environment 102. Each of the computing environment 101 and the inspection environment 102 is, according to an embodiment, a cloud computing environment. In certain embodiments, the computing environment 101 includes resources, principals, and the like.

For example, in an embodiment, a resource is a cloud entity, such as a provisioned hardware (e.g., a processor, a memory, a storage, and the like), an application, a service, a combination thereof, and the like. In some embodiments, a resource is a virtual machine, a software container, a serverless function, a combination thereof, and the like.

In certain embodiments, a principal is a cloud entity, such as a user account, a service account, a role, and the like. In an embodiment, a principal is a cloud entity which is authorized to initiate an action in a cloud computing environment.

In some embodiments, the computing environment 101 includes resources such as a virtual machine 110, a serverless function 120, a software container 130, combinations thereof, and the like. In an embodiment, a virtual machine 110 is deployed as Oracle® VirtualBox®, a serverless function 120 is deployed using Amazon® Lambda, and a software container is deployed utilizing a software container engine such as Docker® Engine, Kubernetes® platform, and the like.

In certain embodiments, the computing environment 101 includes principals such as a forensic account 140. For example, in an embodiment, the forensic account 140 is a service account which is configured to be assumed by a principal of the inspection environment 102. In an embodiment, the forensic account 140 is a principal which is configured to access, deploy, install, initiate, a combination thereof, and the like, a data extraction tool, and inspector, a scanner, a forensic analyzer, a data recovery tool, a library of software tools, a combination thereof, and the like.

For example, in an embodiment, the forensic account 140 is configured to access a software container 130 on which The Sleuth Kit (TSK) is deployed. According to an embodiment, TSK is a collection of software tools for extracting data from a storage to facilitate forensic analysis of computer systems. In an embodiment, the software tools are accessible via a command line, a graphical user interface, a combination thereof, and the like.

In some embodiments, the virtual machine 110 includes a disk 112, which is used for data storage. In some embodiments, the disk 112 includes software application data, binary files, software libraries, machine code, bytecode, a certificate, an encryption key, a combination thereof, and the like. It is beneficial to detect cybersecurity threats, misconfigurations, vulnerabilities, exposures, and the like. In an embodiment, an inspectable disk 114 is generated based on the disk 112 of the virtual machine 110. For example, in an embodiment the inspectable disk 114 is generated in response to initiating a clone disk operation, which generates a clone of the disk 112. In some embodiments, the inspectable disk 114 is generated using a snapshot, a copy, a clone, a combination thereof, and the like.

In some embodiments, a forensic account 140 is configured with access permissions for the inspectable disk 114, allowing the forensic account 140 to initiate forensic analysis actions in the computing environment 101.

According to an embodiment, an inspection environment 102 is communicatively coupled with the computing environment 101. For example, in an embodiment, the inspection environment 102 is configured to access the computing environment 101 over a network connection, including, for example, the Internet. In an embodiment, the inspection environment 102 includes an inspector 150, a forensic analyzer 160, and a security database 170. In some embodiments, the inspector 150 is configured to detect a cybersecurity threat, a misconfiguration, a vulnerability, an exposure, a cybersecurity object, a combination thereof, and the like.

For example, in some embodiments, the inspector 150 is configured to detect a cybersecurity object on a disk, such as the inspectable disk 114. In an embodiment, a cybersecurity object is an application, an operating system, a certificate, a password, a malware, a code object, a forensic artifact, a combination thereof, and the like. In certain embodiments, the forensic analyzer 160 is configured to initiate inspection, scanning, detection, and the like, by the inspector 150 of an inspectable disk 114 in response to detecting a cybersecurity object, such as a forensic artifact, on the inspectable disk 114.

In certain embodiments, a forensic artifact is a file containing metadata, a file containing content of a deleted file, a cookie, a content extracted from a cache memory, a content extracted from a cache storage, website data, a disk image, a file attribute value, a record in a network log, a record in a cloud log, a combination thereof, and the like. According to an embodiment, a forensic artifact is an indicator that a digital asset, such as a computer, a virtual machine, a disk, a software container, a bucket, and the like, was accessed by an unauthorized party.

In some embodiments, the security database 170 is a graph database, such as Neo4j®, which is utilized to store a representation of a computing environment, such as the computing environment 101, based on a predefined data schema. For example, in an embodiment, entities of the computing environment 101 are represented by nodes. In some embodiments, a cloud entity, such as a principal, a resource, an enrichment, and the like, are represented by nodes in a security graph stored on the security database 170. In an embodiment, the nodes are generated based on a predefined data schema for each type of entity.

In an embodiment, the forensic analyzer 160 is configured to detect a forensic artifact, and store a representation of the forensic artifact in the security graph, for example as a node. In some embodiments, the forensic analyzer 160 is further configured to store an edge, connecting, for example, a node representing a forensic artifact to a node representing a resource on which the forensic artifact was detected.

Figure 2:
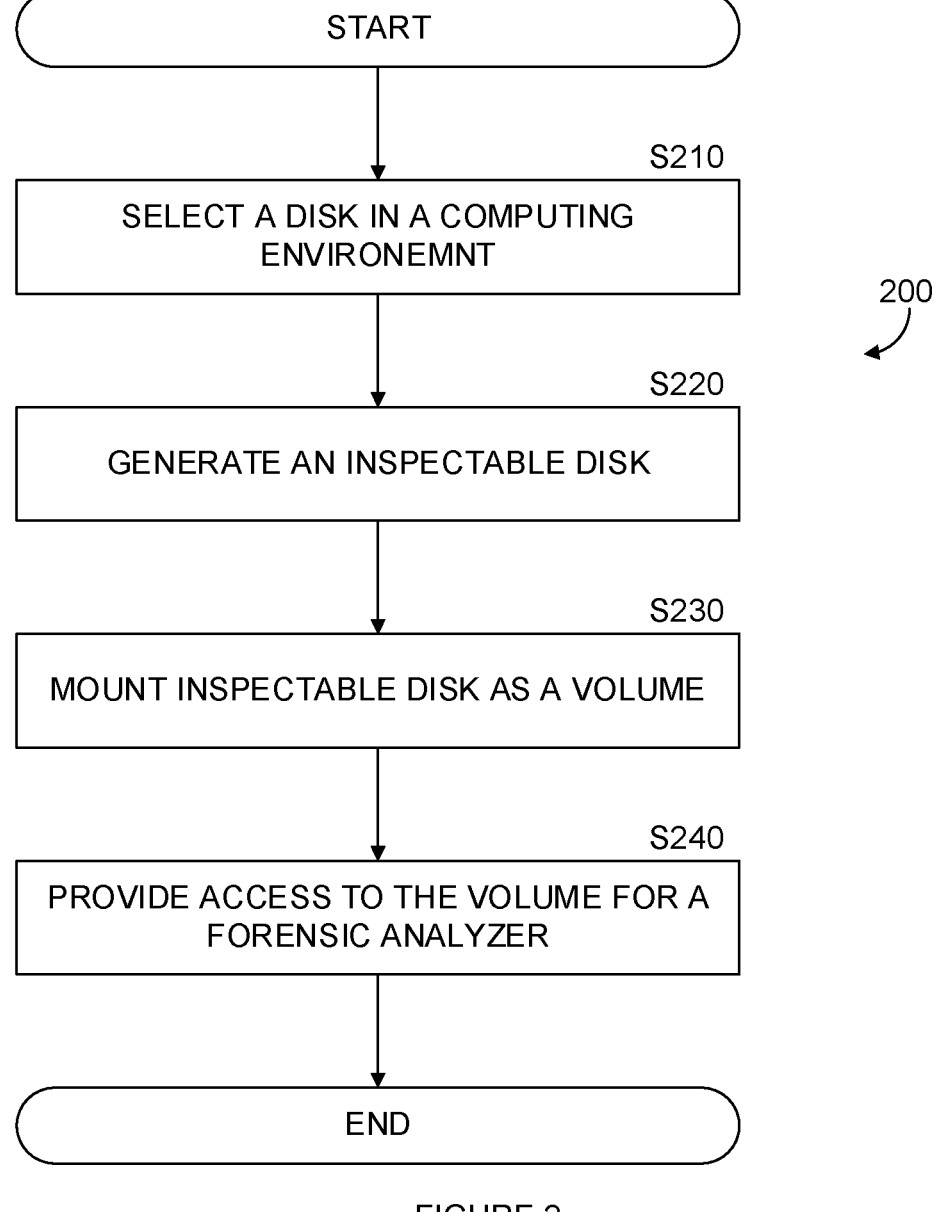
FIG. 2 is an example flowchart of a method for generating an inspectable disk, implemented in accordance with an embodiment.

FIG. 2 is an example flowchart of a method for generating an inspectable disk, implemented in accordance with an embodiment.

At S210, a disk is selected in a computing environment. In an embodiment, the disk is selected based on a forensic analysis. In some embodiments, a disk is selected based on a determination that a resource associated with the disk is suspected of being vulnerable, having a misconfiguration, having an exposure, and the like.

For example, in an embodiment, a forensic analysis is performed on a computing environment. In an embodiment, a forensic analyzer is configure to perform the forensic analysis, which includes, for example, detecting a suspicious event in a network log. In some embodiments, a suspicious event corresponds to a data record having predetermined values, a data record being in temporal proximity to another data record, a data record indicating a principal having a predetermined permission, a combination thereof, and the like.

In some embodiments, the forensic analysis includes detecting a resource, such as a virtual machine, which is associated with a disk, a bucket, a storage, and the like. In an embodiment, selection of the disk in the computing environment is based on the forensic analysis, and the disk is selected based on an identifier of a disk associated with a resource of the forensic analysis. In some embodiments, the forensic analysis includes an output report, which includes an identifier of a resource, an identifier of a disk, a combination thereof, and the like, based off of which a disk is selected for generating an inspectable disk therefrom.

A S220, an inspectable disk is generated. In an embodiment, an inspectable disk is a clone, a snapshot, a copy, a combination thereof, and the like, of the selected disk. Generating an inspectable disk is advantageous as this allows to perform inspection, analysis, and the like operations on a disk, without disturbing the original disk which is in, for example, a production environment.

In some embodiments, generating an inspectable disk includes re-encrypting an encrypted disk. For example, in some embodiments, a disk is encrypted in a cloud computing environment, based on a first key which is associated with a first principal, such as a user account. An inspectable disk is generated including a re-encrypt command, configuring the cloud computing environment to re-encrypt the inspectable disk, such that the inspectable disk is encrypted with a second key associated with a second principal, such as a forensic service account.

At S230, the inspectable disk is mounted as a volume. In an embodiment, the disk is mounted to a volume which is associated with a resource, such as a virtual machine, a software container, and the like. In an embodiment, the disk is mounted as a volume at a mount point. Mounting the inspectable disk to a volume associated with a resource which is not the resource which is associated with the disk (from which the inspectable disk was generated) is beneficial, in an embodiment, as it allows to inspect a disk for further cybersecurity objects, cybersecurity threats, forensic artifacts, a combination thereof, and the like, without disturbing the original resource, the disk, etc.

At S240, access to the inspectable disk is provided to a forensic analyzer. In an embodiment, providing access to the inspectable disk for the forensic analyzer includes providing access to a forensic account, which is a service account, that can be assumed by a forensic analyzer. For example, the forensic account is a principal having permissions in a cloud computing environment in which the inspectable disk is deployed, the permissions allowing the forensic account to manipulate, read, write, delete, etc. data from the inspectable disk.

In some embodiments, the inspectable disk is available for a predefined time to the forensic analyzer. For example, in an embodiment, the inspectable disk utilizes a resource which is set to expire after a predefined time. This allows to repurpose a provisioned resource and reduces wasted resources, as once forensic analysis is complete, in an embodiment, there is no further use for the inspectable disk. In some embodiments, the inspectable disk, the forensic analyzer, and the like, are deprovisioned, spun down, and the like, to free resources used by the same.

Figure 3:
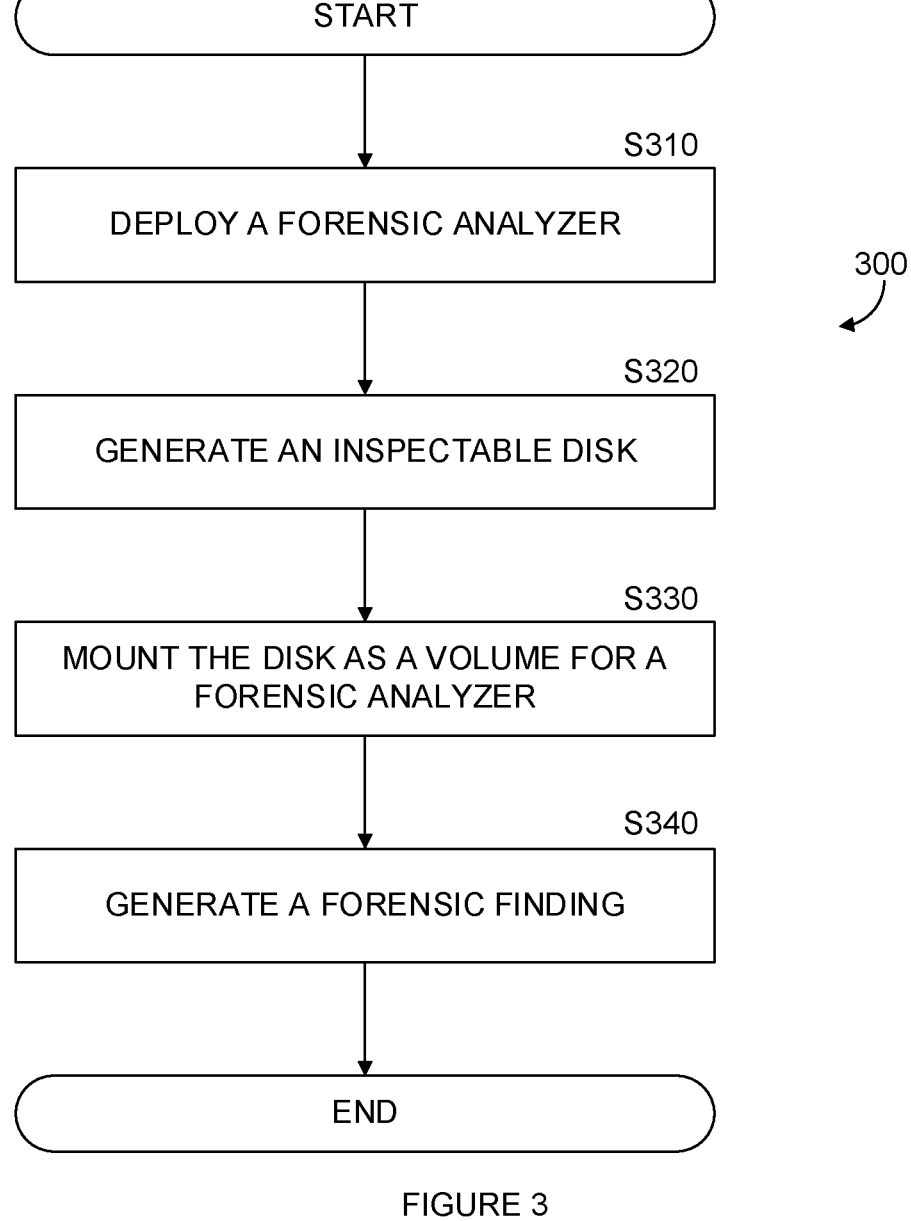
FIG. 3 is an example flowchart of method for utilizing a forensic analyzer, implemented in accordance with an embodiment.

FIG. 3 is an example flowchart of method for utilizing a forensic analyzer, implemented in accordance with an embodiment.

At S310, a forensic analyzer workload is deployed. In an embodiment, the forensic analyzer is deployed as a virtual machine, a software container, a serverless function, a combination thereof, and the like.

In certain embodiments, the forensic analyzer workload (also referred to as a forensic analyzer) includes a digital forensic tool. In an embodiment, a digital forensic tool includes an operating system, an application, a service, a library, a binary, a combination thereof, and the like. For example, according to an embodiment, a digital forensic tool utilizes Parrot Security OS, and further includes Autopsy®, Digital Forensics Framework (DFF), IsoBuster®, The Sleuth Kit (TSK), Magnet® AXIOM, HashKeeper, and the like.

In an embodiment, a digital forensic tool is a memory forensic tool. A memory forensic tool is a software tool (e.g., application) which is capable of accessing, acquiring, analyzing, and the like, a volatile memory of a computer system, according to an embodiment. For example, a volatile memory is, in an embodiment, a RAM (Random Access Memory).

At S320, an inspectable disk is generated. In certain embodiments, the inspectable disk is generated based on the methods disclosed herein. In an embodiment, an inspectable disk is a clone, a snapshot, a copy, a combination thereof, and the like, of the selected disk. Generating an inspectable disk is advantageous as this allows to perform inspection, analysis, and the like operations on a disk, without disturbing the original disk which is in, for example, a production environment.

In some embodiments, generating an inspectable disk includes re-encrypting an encrypted disk. For example, in some embodiments, a disk is encrypted in a cloud computing environment, based on a first key which is associated with a first principal, such as a user account. An inspectable disk is generated including a re-encrypt command, configuring the cloud computing environment to re-encrypt the inspectable disk, such that the inspectable disk is encrypted with a second key associated with a second principal, such as a forensic service account.

At S330, the inspectable disk is mounted as a volume of the forensic analyzer. In an embodiment, the disk is mounted to a volume which is associated with a resource on which the forensic analyzer is deployed, such as a virtual machine, a software container, and the like. In an embodiment, the disk is mounted as a volume at a mount point. Mounting the inspectable disk to a volume associated with the forensic analyzer is beneficial, in an embodiment, as it allows to inspect a disk for further cybersecurity objects, cybersecurity threats, forensic artifacts, a combination thereof, and the like, without disturbing the original resource, the disk, etc.

At S340, a forensic finding is generated. In an embodiment, a forensic finding is generated by utilizing a digital forensic tool. For example, in an embodiment, a forensic finding includes a forensic artifact.

In some embodiments, a forensic finding is generated based on detecting an event in a log file. In certain embodiments, a first forensic artifact is detected from a disk, and a second forensic artifact is detected in a log file. In some embodiments, the forensic finding is generated based on the first forensic artifact and the second forensic artifact. According to an embodiment, a forensic finding is generated only based on detection of an event, a plurality of events, and the like, in a log file, in a plurality of log files, in a database of records, and the like.

In certain embodiments, a forensic artifact is a file containing metadata, a file containing content of a deleted file, a cookie, a content extracted from a cache memory, a content extracted from a cache storage, website data, a disk image, a file attribute value, a record in a network log, a record in a cloud log, a combination thereof, and the like.

According to an embodiment, a forensic artifact is an indicator that a digital asset, such as a computer, a virtual machine, a disk, a software container, a bucket, and the like, was accessed by an unauthorized party.

For example, in an embodiment, a forensic finding includes a data record detected on a disk, indicating that a principal, such as a user account, role, and the like, associated with a resource of the disk, were provided a permission, performed an access operation, generated a new principal, performed a combination thereof, and the like. In some embodiments, a forensic report is generated including a plurality of forensic findings. In an embodiment, the forensic report is a data structure including data records detected on the inspectable disk.

Figure 4:
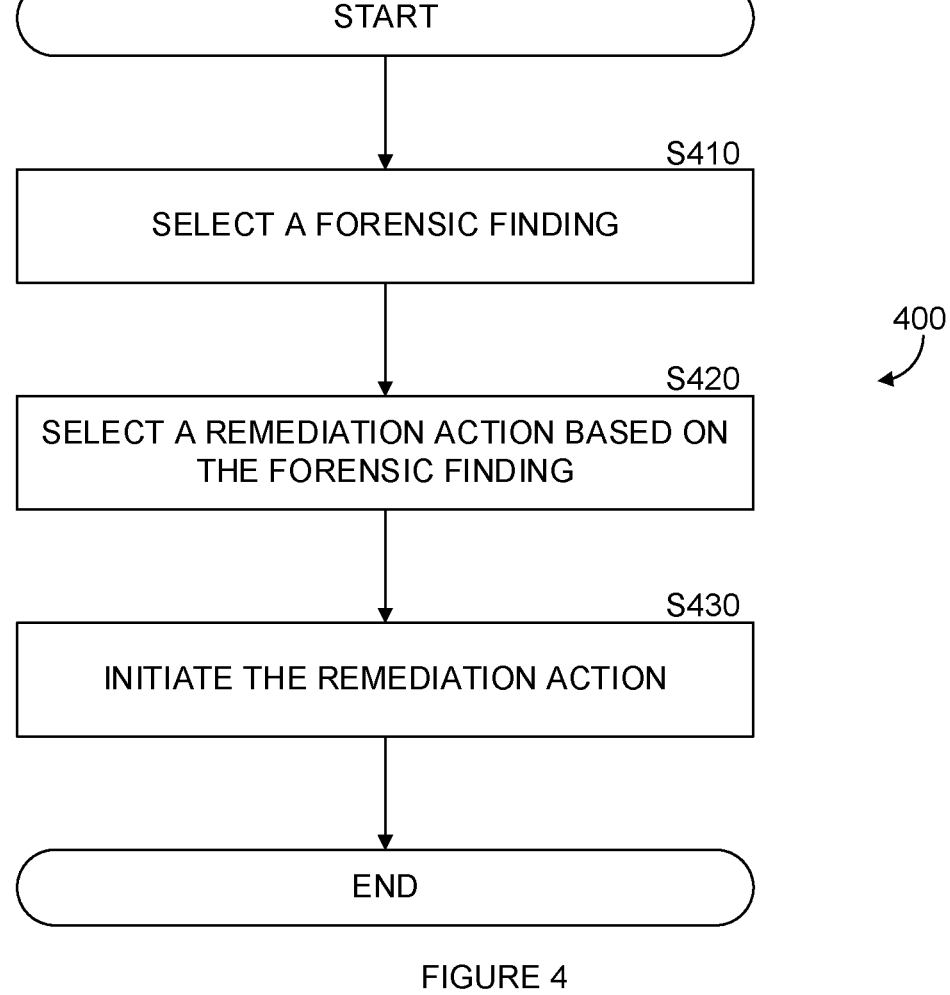
FIG. 4 is an example flowchart of a method for initiating a remediation action in response to detecting a cybersecurity forensic artifact, implemented in accordance with an embodiment.

FIG. 4 is an example flowchart of a method for initiating a remediation action in response to detecting a cybersecurity forensic artifact, implemented in accordance with an embodiment.

At S410, a forensic finding is selected. In an embodiment, a forensic finding is selected from a forensic report. In some embodiments, a forensic report is generated including a plurality of forensic findings. In an embodiment, the forensic report is a data structure including data records detected on the inspectable disk.

In an embodiment, a forensic finding is generated by utilizing a digital forensic tool. For example, in an embodiment, a forensic finding includes a forensic artifact.

In certain embodiments, a forensic artifact is a file containing metadata, a file containing content of a deleted file, a cookie, a content extracted from a cache memory, a content extracted from a cache storage, website data, a disk image, a file attribute value, a record in a network log, a record in a cloud log, a combination thereof, and the like.

According to an embodiment, a forensic artifact is an indicator that a digital asset, such as a computer, a virtual machine, a disk, a software container, a bucket, and the like, was accessed by an unauthorized party.

At S420, a remediation action is selected based on the forensic finding. In an embodiment, a remediation action includes an instruction which, when executed, configures an inspector to inspect the inspectable disk on which the selected forensic finding was generated.

In some embodiments, the inspector is configured to inspect the inspectable disk for a cybersecurity object, such as a misconfiguration, a vulnerability, a lateral movement, a secret, a malware object, a malware code, a data record indicating a cybersecurity event, a combination thereof, and the like. In certain embodiments, where an inspector is configured to inspect for a specific cybersecurity object, the inspector is selected based on the forensic finding.

In an embodiment, a remediation action includes generating a notification, generating a ticket in a ticketing system, adding a rule to a policy, updating a rule to a policy, deleting a cryptographic key, removing a permission, revoking network access, sandboxing the resource associated with the disk, based on which the inspectable disk was generated, a combination thereof, and the like.

At S430, the remediation action is initiated. In an embodiment, the remediation action is initiated by a forensic account, a forensic analyzer, a combination thereof, and the like. In certain embodiments, the remediation action includes an instruction which, when executed by a processing circuitry, configures a system of the processing circuitry to perform the remediation action. In an embodiment, the remediation action is an action which is predefined as authorized for the forensic account, the forensic analyzer, and the like, to perform. In certain embodiments, certain remediation actions require additional approval prior to execution. In such embodiments, the forensic account, forensic analyzer, and the like, are configured to generate a notification indicating that additional approval is required in order to initiate the action.

In some embodiments, a plurality of remediation actions are initiated. In certain embodiments, a first plurality of remediation actions are initiated based on a first forensic finding, and a second plurality of remediation actions are each initiated based on one of a plurality of second forensic findings.

Figure 5:
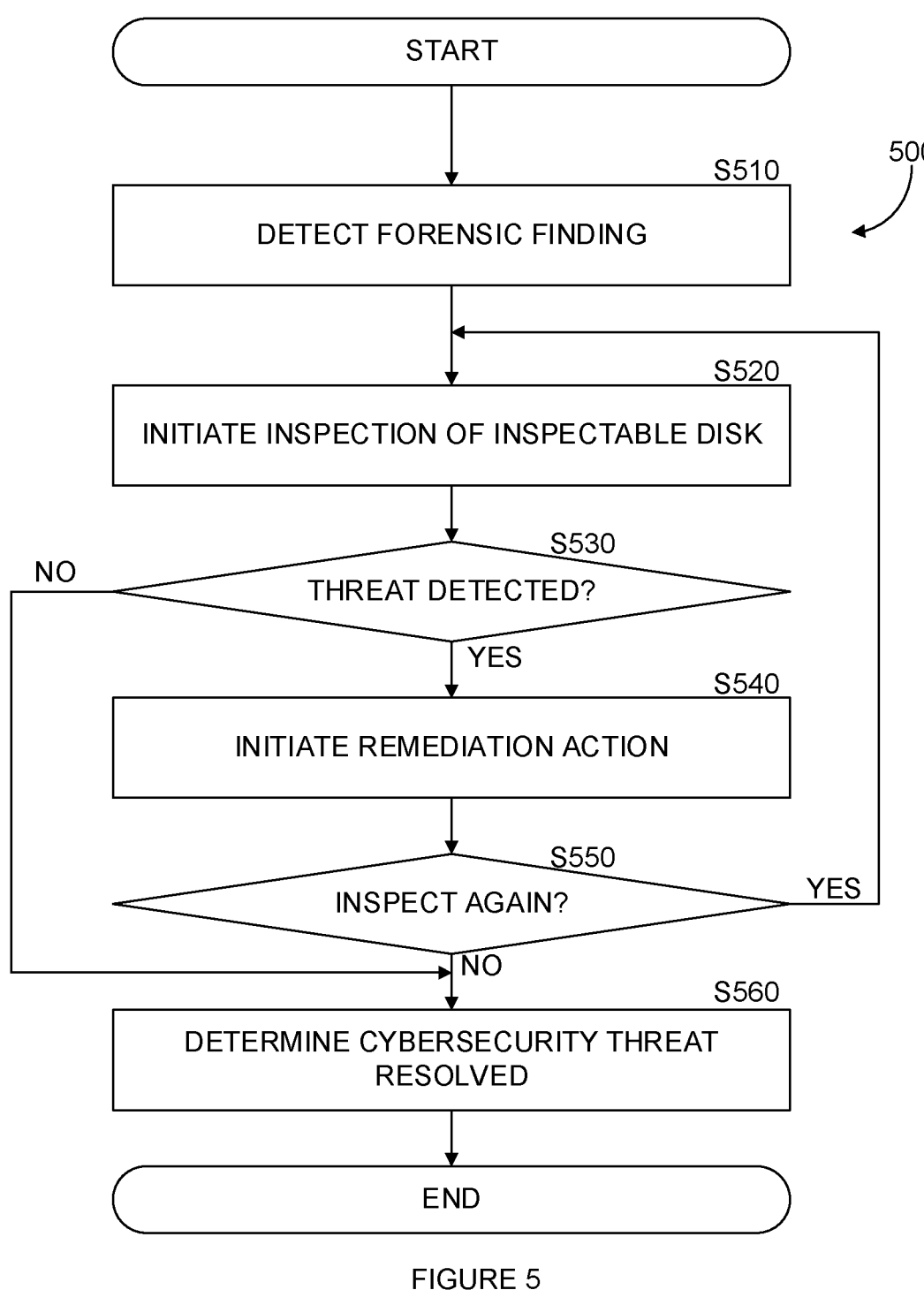
FIG. 5 is an example flowchart of a detection and remediation feedback system, implemented in accordance with an embodiment.

FIG. 5 is an example flowchart of a detection and remediation feedback system, implemented in accordance with an embodiment.

At S510, a forensic finding is detected. In an embodiment, the forensic finding is detected on a security graph, for example by traversing the security graph to detect a node having a data structure utilized to store a forensic finding. In an embodiment, a node in a security graph having a data structure utilized to store a forensic finding includes a tag, a metadata value, a flag, and the like, indicating that the node represents a forensic finding.

In some embodiments, the node representing the forensic finding is connected, for example via an edge, to a node representing a disk, a node representing a resource, and the like. In an embodiment, such a connection represents that the forensic finding was generated based on a forensic artifact detected on the disk, on a resource connected to the disk, etc.

In an embodiment, a forensic finding is generated by utilizing a digital forensic tool. For example, in an embodiment, a forensic finding includes a forensic artifact. In certain embodiments, a forensic artifact is a file containing metadata, a file containing content of a deleted file, a cookie, a content extracted from a cache memory, a content extracted from a cache storage, website data, a disk image, a file attribute value, a record in a network log, a record in a cloud log, a combination thereof, and the like.

According to an embodiment, a forensic artifact is an indicator that a digital asset, such as a computer, a virtual machine, a disk, a software container, a bucket, and the like, was accessed by an unauthorized party.

For example, in an embodiment, a forensic finding includes a data record detected on a disk, indicating that a principal, such as a user account, role, and the like, associated with a resource of the disk, were provided a permission, performed an access operation, generated a new principal, performed a combination thereof, and the like. In some embodiments, a forensic report is generated including a plurality of forensic findings. In an embodiment, the forensic report is a data structure including data records detected on the inspectable disk.

At S520, inspection of an inspectable disk is initiated. In an embodiment, the inspectable disk is a disk on which the forensic artifact was detected, based on which a forensic finding was generated. A representation of a disk (based on which the inspectable disk is generated), and a representation of the forensic finding, are each stored in a security graph having further stored therein a representation of a computing environment in which the disk is deployed, according to an embodiment.

For example, in an embodiment, an inspectable disk is generated based on a first disk deployed in a cloud computing environment. According to an embodiment, a digital forensic software tool is configured to analyze the inspectable disk, for example to detect a forensic artifact and generate a forensic finding therefrom. In an embodiment, the forensic finding is stored in the security graph (e.g., represented a node in the security graph). In some embodiments, the forensic finding is matched to a cybersecurity threat, a vulnerability, a misconfiguration, an exposure, and the like.

In some embodiments, an inspector is configured to inspect the inspectable disk for the cybersecurity threat, the vulnerability, the misconfiguration, the exposure, and the like, which is associated with the forensic finding. In certain embodiments, a forensic finding is associated with a corresponding cybersecurity threat, for example, in a table including a column of cybersecurity threats and a column of forensic findings, such that each row represents a forensic finding and an associated cybersecurity threat.

In certain embodiments, initiating inspection of the inspectable disk includes generating an instruction which when executed configures an inspector in an inspection environment to access the inspectable disk, and perform inspection thereof. For example, in an embodiment, inspecting a disk for a cybersecurity threat includes detecting a cybersecurity object on the disk. In an embodiment, a cybersecurity object is an application, an operating system, a certificate, a password, a malware, a code object, a forensic artifact, a combination thereof, and the like.

At S530, a check is performed to determine if a cybersecurity threat is detected. In an embodiment, the cybersecurity threat is a vulnerability, an exposure, a misconfiguration, a combination thereof, and the like. Where a cybersecurity threat is detected, execution continues at S540, according to an embodiment. In some embodiments, where a cybersecurity threat is not detected, execution continues at S560.

At S540, a remediation action is initiated. In an embodiment, the remediation action is initiated based on a detected cybersecurity object. In certain embodiments, an inspector is configured to select a remediation action from a list of predetermined remediation actions, each remediation action corresponding to at least one cybersecurity threat.

In an embodiment, a remediation action includes generating a notification, generating a ticket in a ticketing system, adding a rule to a policy, updating a rule to a policy, deleting a cryptographic key, removing a permission associated with the resource, revoking network access to the resource, revoking network access from the resource, sandboxing the disk, a combination thereof, and the like.

In an embodiment, the remediation action is performed on the disk, on the inspectable disk, on a combination thereof, and the like. For example, in an embodiment, a remediation action is performed on the inspectable disk prior to performing the remediation action on the disk. This is advantageous, in certain embodiments, to determine that the remediation action is effective against the determined cybersecurity threat.

At S550, a check is performed to determine if the inspectable disk should be inspected again. In an embodiment, the check is performed after the remediation action is complete. This is advantageous as it allows to determine that the cybersecurity threat no longer exists and that the remediation action was successful. In some embodiments, execution continues at S520, where a determination is that the inspectable disk should be inspected again. In an embodiment, the inspectable disk is inspected for another cybersecurity threat, the same cybersecurity threat, a combination thereof, and the like.

In certain embodiments, executions continues at S560 in response to determining that the inspectable disk should not be inspected again. In an embodiment, the determination is performed in response to detecting that the cybersecurity threat has been resolved. For example, a cybersecurity threat is resolved when a cybersecurity object that was previously detected is no longer detected.

At S560, the cybersecurity threat is determined to be resolved. In an embodiment, a cybersecurity threat is resolved when a cybersecurity object that was previously detected on an inspectable disk is not detected in a subsequent inspection. In certain embodiments, the inspectable disk is deprovisioned, the remediation action is initiated on the disk, and a second inspectable disk is generated based on the disk after the remediation action has completed. This allows to determine if the remediation action was effective and the cybersecurity threat is no longer present.

In some embodiments, where the cybersecurity threat is determined to be resolved, a representation of the cybersecurity object, the forensic artifact, the forensic finding, a combination thereof, and the like, is removed from the security graph.

Figure 6:
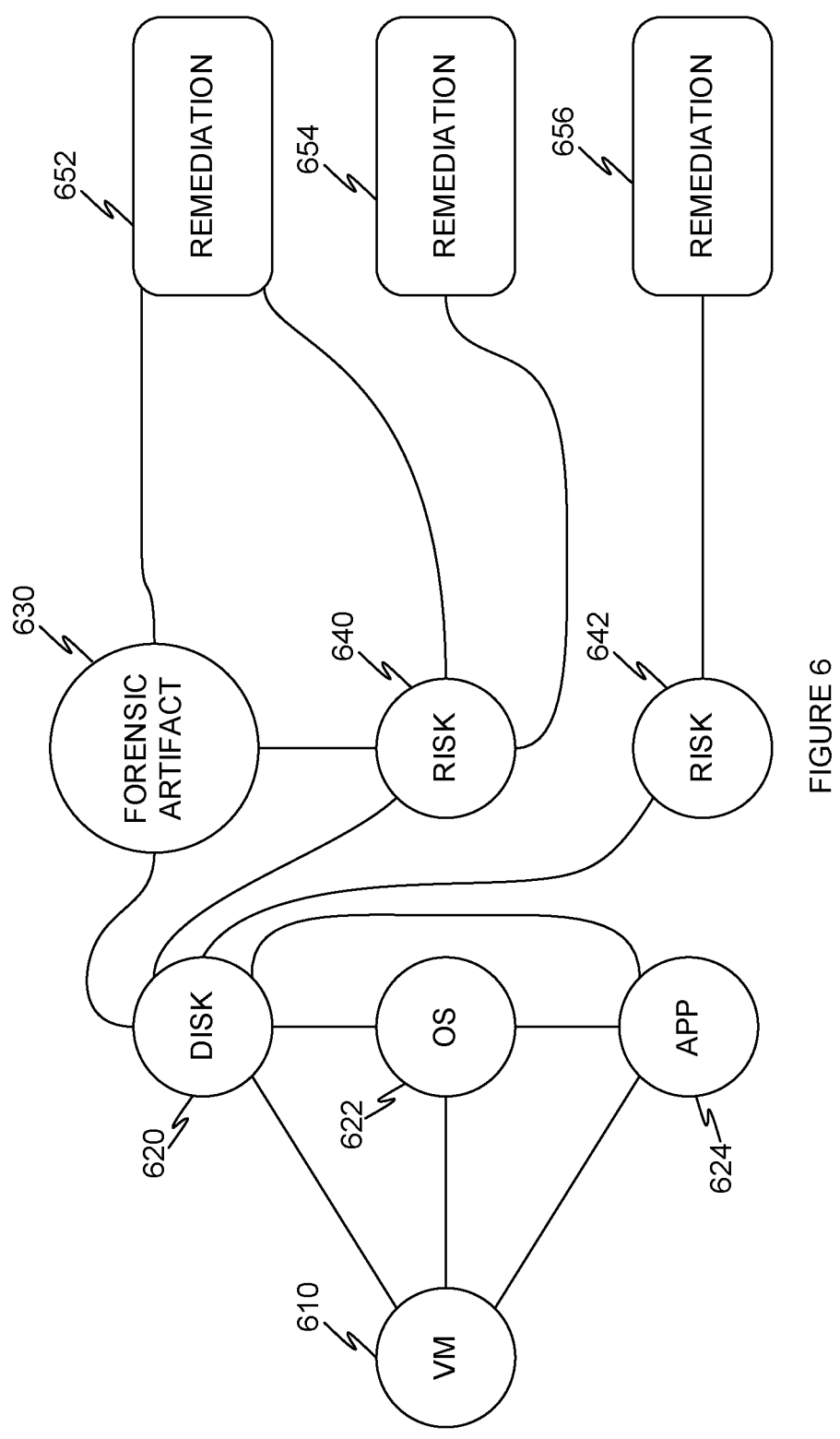
FIG. 6 is an example security graph, utilized to describe an embodiment.

FIG. 6 is an example security graph portion, utilized to describe an embodiment. In an embodiment, a security graph includes a representation of a computing environment, such as the computing environment 101 of FIG. 1 above. In some embodiments, a node in the security graph represents a principal, a resource, an enrichment, a detected cybersecurity object, a forensic finding, a forensic artifact, a remediation action, and the like.

For example, in an embodiment, a virtual machine is represented by a VM node 610. In an embodiment, the VM node 610 is a resource node, which is a node having a data schema configured to represent a resource. For example, in an embodiment, a resource node includes data fields describing a resource, such as identifier, IP address, subnet, VPC name, resource type (e.g., application, workload, virtual machine, software container, serverless function, etc.).

In an embodiment, the VM node 610 is connected to a disk node 620, an OS node 622, and an application node 624. In an embodiment, the disk node 620 represents a disk, a storage, and the like, which is provisioned to the virtual machine represented by the VM node 610. In an embodiment, an inspector configured to inspect the disk represented by the disk node 620, detects an operating system (OS) represented by the OS node 622, and a software application represented by application node 624.

In certain embodiments, a forensic analyzer detects a forensic artifact on the disk represented by the disk node 620. In some embodiments, the forensic analyzer is further configured to generate a forensic finding, represented by a forensic node 630. In an embodiment, the forensic node 630 is generated based on a forensic data schema, and includes data fields for describing a forensic event, such as event type (e.g., access type, identity type, lateral movement, exposed secret, etc.), timestamp, and the like.

In an embodiment, a cybersecurity risk (also referred to as a cybersecurity threat) is represented by a risk node 640. In some embodiments, the risk node 640 is connected to disk node 620, the forensic node 630, and a remediation node. In certain embodiments, a cybersecurity risk is a misconfiguration, a vulnerability, an exposure, an exposed secret, a lateral movement, a permission escalation, an excessive access, a combination thereof, and the like.

In certain embodiments, certain types of forensic nodes, such as the forensic node 630, are predetermined to have a connection to a risk node, such as risk node 640. This is beneficial, for example, where a forensic artifact (represented by a forensic node) is a result of a certain known cybersecurity threat, such as a misconfiguration, represented by a risk node. In some embodiments, this representation allows for a compact representation, i.e., a reduced amount of storage, memory, and the like, when representing a computing environment. This is due, for example, to storing data one time in a node (for example, which represents a certain cybersecurity risk), and connecting resource nodes having said risk to the risk node, rather than storing data describing the risk in each and every node representing a different resource in which the same risk is detected.

In some embodiments, a remediation action is represented by a remediation node, such as a first remediation node 652, and a second remediation node 654. According to an embodiment, a forensic node, a risk node, and both, are connected to a remediation node. For example, the forensic node 630 and the risk node 640 are both connected to the remediation node 652, according to an embodiment. In some embodiments, the risk node 640 is further connected to the second remediation node 654, as a risk can be remediated with a plurality of remediation actions, according to some embodiments.

In certain embodiment, a cybersecurity risk is not related to a forensic artifact. For example, in an embodiment, a cybersecurity risk, represented by risk node 642 is connected to the disk node 620 and to a remediation node 656. Certain cybersecurity risks are further evidenced by digital artifacts, while others are not. For example, an excessive permission is a cybersecurity risk, however, there is not always evidence (e.g., a forensic artifact) to indicate that the excessive permission was used. Such use would be apparent, for example, in a network log, cloud log, security log, combination thereof, and the like.

Representing a remediation action on a security graph using a remediation node is likewise beneficial as wherever a forensic artifact is detected, a corresponding remediation action can be detected by traversing the graph. Furthermore, new remediation actions are represented as nodes in the security graph connected to nodes representing forensic findings, thereby, when a forensic artifact is detected on a disk, by traversing the security graph, a remediation is easily detected, allowing to initiate the remediation action in a shorter amount of time. This is especially useful as time is of essence when mitigating a cybersecurity risk.

Figure 7:
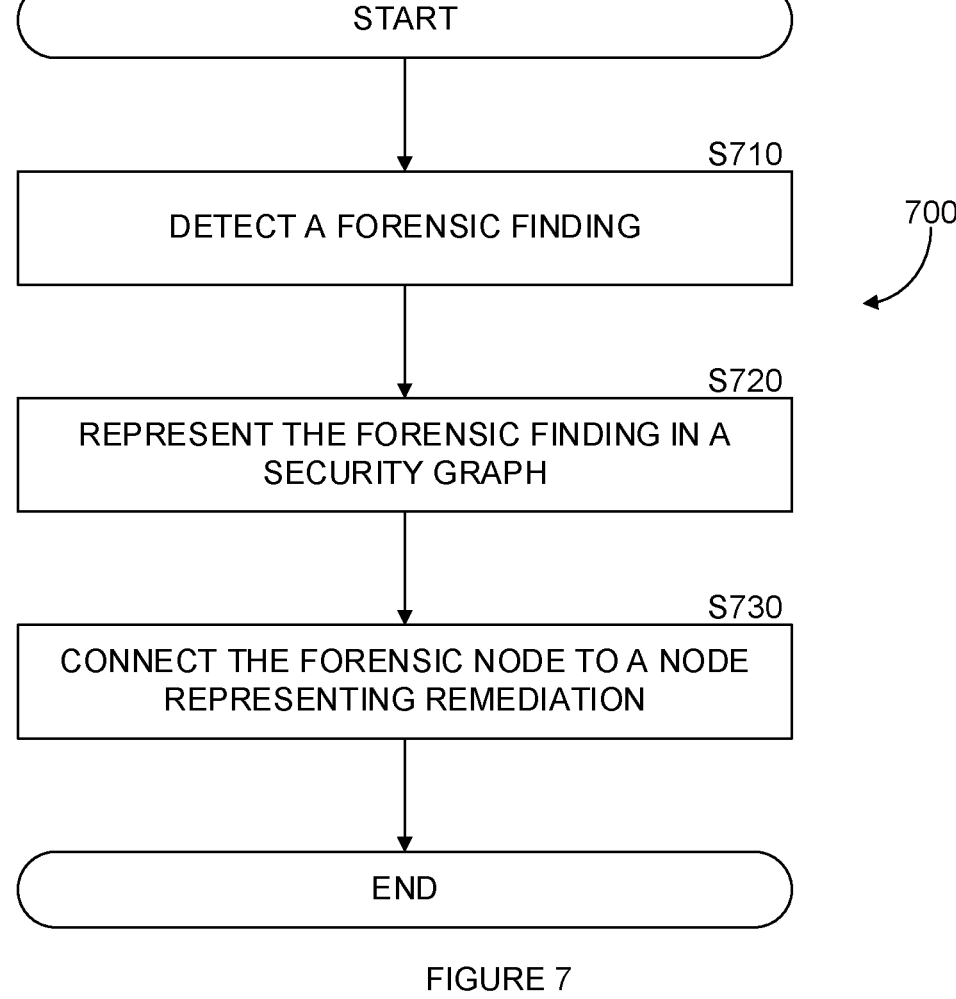
FIG. 7 is an example flowchart of a method for representing a remediation action in a security graph, implemented in accordance with an embodiment.

FIG. 7 is an example flowchart of a method for representing a remediation action in a security graph, implemented in accordance with an embodiment.

At S710, a forensic finding is detected. In an embodiment, the forensic finding is detected on a security graph, for example by traversing the security graph to detect a node having a data structure utilized to store a forensic finding. In an embodiment, a node in a security graph having a data structure utilized to store a forensic finding includes a tag, a metadata value, a flag, and the like, indicating that the node represents a forensic finding.

In some embodiments, the node representing the forensic finding is connected, for example via an edge, to a node representing a disk, a node representing a resource, and the like. In an embodiment, such a connection represents that the forensic finding was generated based on a forensic artifact detected on the disk, on a resource connected to the disk, etc.

In an embodiment, a forensic finding is generated by utilizing a digital forensic tool. For example, in an embodiment, a forensic finding includes a forensic artifact. In certain embodiments, a forensic artifact is a file containing metadata, a file containing content of a deleted file, a cookie, a content extracted from a cache memory, a content extracted from a cache storage, website data, a disk image, a file attribute value, a record in a network log, a record in a cloud log, a combination thereof, and the like.

According to an embodiment, a forensic artifact is an indicator that a digital asset, such as a computer, a virtual machine, a disk, a software container, a bucket, and the like, was accessed by an unauthorized party.

For example, in an embodiment, a forensic finding includes a data record detected on a disk, indicating that a principal, such as a user account, role, and the like, associated with a resource of the disk, were provided a permission, performed an access operation, generated a new principal, performed a combination thereof, and the like. In some embodiments, a forensic report is generated including a plurality of forensic findings. In an embodiment, the forensic report is a data structure including data records detected on the inspectable disk.

At S720, the forensic finding is represented in a security graph. In certain embodiments, a forensic analyzer detects a forensic artifact on the disk represented by a disk node in the security graph. In some embodiments, the forensic analyzer is further configured to generate a forensic finding, represented by a forensic node, e.g., as discussed in FIG. 6 above.

In an embodiment, a forensic node is generated based on a forensic data schema, and includes data fields for describing a forensic event, such as event type (e.g., access type, identity type, lateral movement, exposed secret, etc.), timestamp, and the like.

In certain embodiments, certain types of forensic nodes, are predetermined to have a connection to a risk node, representing a cybersecurity threat. This is beneficial, for example, where a forensic artifact (represented by a forensic node) is a result of a certain known cybersecurity threat, such as a misconfiguration, represented by a risk node.

In some embodiments, this representation allows for a compact representation, i.e., a reduced amount of storage, memory, and the like, when representing a computing environment. This is due, for example, to storing data one time in a node (for example, which represents a certain cybersecurity risk), and connecting resource nodes having said risk to the risk node, rather than storing data describing the risk in each and every node representing a different resource in which the same risk is detected.

At S730, the forensic node is connected to a remediation node. In an embodiment, the forensic node is predetermined to be connected to a remediation node. In some embodiments, a forensic node is connected to a risk node, representing a cybersecurity risk, and the risk node is connected to the remediation node. In such an embodiment, the forensic node is connected to the remediation node based on the connection between the risk node and the remediation node. In some embodiments, a risk node, a forensic node, and the like, are connected to a plurality of remediation nodes. Each remediation node represents, according to an embodiment, a remediation action.

In an embodiment, a remediation action includes generating a notification, generating a ticket in a ticketing system, adding a rule to a policy, updating a rule to a policy, deleting a cryptographic key, removing a permission, revoking network access, sandboxing the resource associated with the disk, based on which the inspectable disk was generated, a combination thereof, and the like.

According to an embodiment, a forensic artifact is detected on an inspectable disk. In some embodiments, the forensic artifact is utilized to traverse a security graph to detect a forensic finding which corresponds to the forensic artifact. The security graph is further traversed, according to some embodiments, to detect a remediation node connected to a node representing the forensic finding. In an embodiment, a remediation action represented by the remediation node is initiated based on detecting the remediation node.

Figure 8:
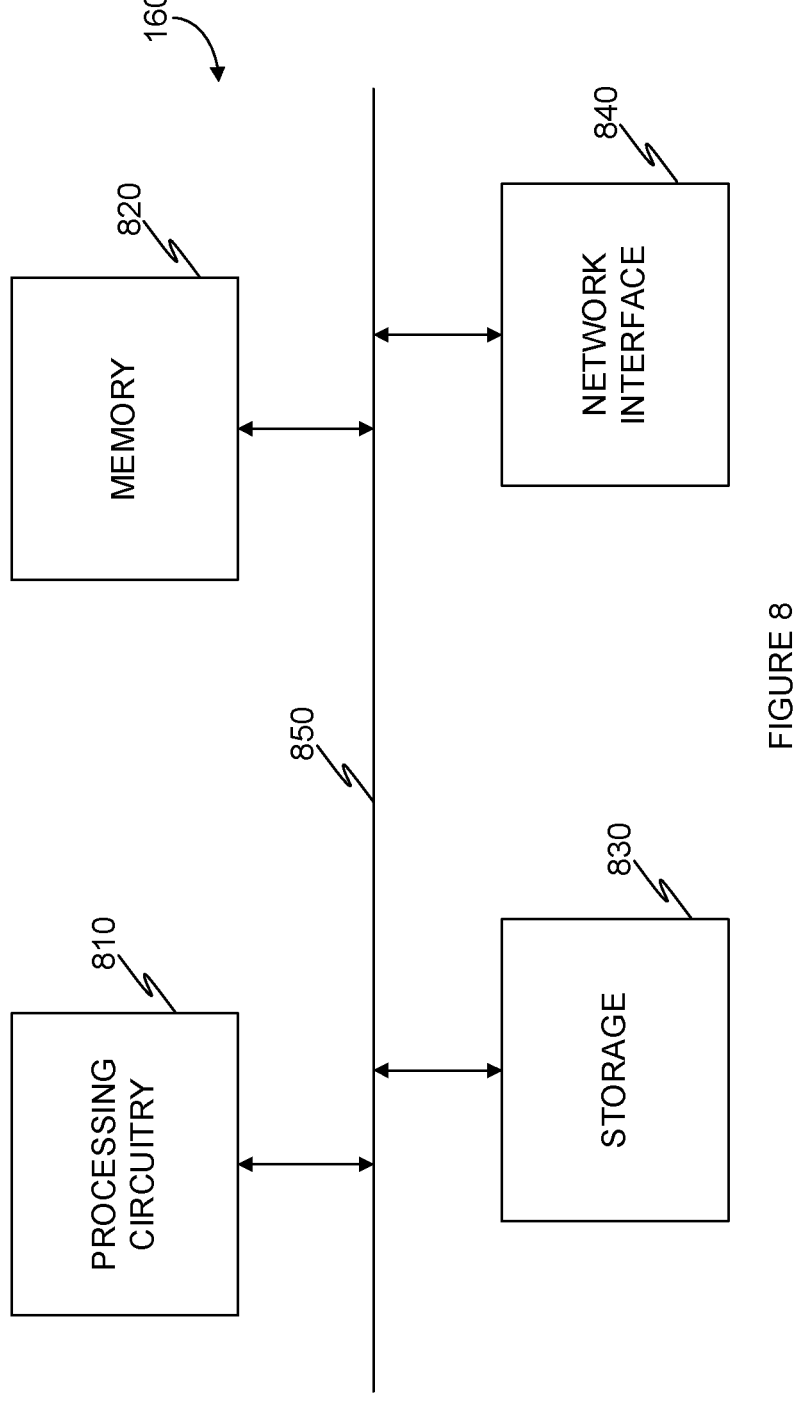
FIG. 8 is an example schematic diagram of a forensic analyzer according to an embodiment.

FIG. 8 is an example schematic diagram of a forensic analyzer 160 according to an embodiment. The forensic analyzer 160 includes a processing circuitry 810 coupled to a memory 820, a storage 830, and a network interface 840. In an embodiment, the components of the forensic analyzer 160 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide the forensic analyzer 160 with communication with, for example, the computing environment 101, and assume the forensic account 140.

It should be understood that the embodiments described herein are not limited to the specific architecture illustrated in FIG. 8, and other architectures may be equally used without departing from the scope of the disclosed embodiments.

Furthermore, in certain embodiments the inspector 150 may be implemented with the architecture illustrated in FIG. 8. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a compact representation of a computing environment having a remediated cybersecurity threat, comprising:

generating an inspectable disk based on a disk of a resource in the computing environment;

detecting a forensic artifact on the inspectable disk, wherein the forensic artifact is an indicator that a digital asset was accessed by an unauthorized party;

traversing a security graph for a forensic finding based on the forensic artifact, wherein the security graph includes a representation of the computing environment;

detecting in the security graph a remediation node connected to a node representing the forensic finding; and initiating a remediation action, represented by the remediation node.

2. The method of claim 1, further comprising:

initiating the remediation action on the inspectable disk prior to initiating the remediation action on the disk of the resource.

3. The method of claim 1, further comprising:

traversing the security graph to detect a cybersecurity risk node connected to a node representing the resource; and initiating the remediation action further based on a cybersecurity threat represented by the cybersecurity risk node.

4. The method of claim 3, further comprising:

initiating an inspection of the inspectable disk to detect a cybersecurity object associated with the cybersecurity threat.

5. The method of claim 3, further comprising:

detecting a second remediation node connected to: the cybersecurity risk node, and the node representing the forensic finding.

6. The method of claim 5, further comprising:

initiating a second remediation action.

7. The method of claim 1, further comprising:

detecting a second forensic node connected to the remediation node; and initiating an inspection of the inspectable disk based on the second forensic node to detect another forensic artifact.

8. The method of claim 1, wherein the remediation action is any one of: generating a notification, generating a ticket in a ticketing system, adding a rule to a policy, updating a rule to a policy, deleting a cryptographic key, removing a permission, revoking network access, sandboxing the resource associated with the disk, based on which the inspectable disk was generated, and any combination thereof.

9. The method of claim 1, wherein the forensic artifact is any one of: a file containing metadata, a file containing content of a deleted file, a cookie, a content extracted from a cache memory, a content extracted from a cache storage, website data, a disk image, a file attribute value, a record in a network log, a record in a cloud log, and any combination thereof.

10. A non-transitory computer readable medium having stored thereon instructions for causing a processing circuitry to execute a process for generating a compact representation of a computing environment having a remediated cybersecurity threat, the process comprising:

generating an inspectable disk based on a disk of a resource in the computing environment;

detecting a forensic artifact on the inspectable disk, wherein the forensic artifact is an indicator that a digital asset was accessed by an unauthorized party;

traversing a security graph for a forensic finding based on the forensic artifact, wherein the security graph includes a representation of the computing environment;

detecting in the security graph a remediation node connected to a node representing the forensic finding; and initiating a remediation action, represented by the remediation node.

11. A system for generating a compact representation of a computing environment having a remediated cybersecurity threat, comprising:

a processing circuitry; and a memory, the memory containing instructions that, when executed by the processing circuitry, configure the system to:

generate an inspectable disk based on a disk of a resource in the computing environment;

detect a forensic artifact on the inspectable disk, wherein the forensic artifact is an indicator that a digital asset was accessed by an unauthorized party;

traverse a security graph for a forensic finding based on the forensic artifact, wherein the security graph includes a representation of the computing environment;

detect in the security graph a remediation node connected to a node representing the forensic finding; and initiate a remediation action, represented by the remediation node.

12. The system of claim 11, wherein the memory contains further instructions which when executed by the processing circuitry, further configures the system to:

initiate the remediation action on the inspectable disk prior to initiating the remediation action on the disk of the resource.

13. The system of claim 11, wherein the memory contains further instructions which when executed by the processing circuitry, further configures the system to:

traverse the security graph to detect a cybersecurity risk node connected to a node representing the resource; and initiate the remediation action further based on a cybersecurity threat represented by the cybersecurity risk node.

14. The system of claim 13, wherein the memory contains further instructions which when executed by the processing circuitry, further configures the system to:

initiate an inspection of the inspectable disk to detect a cybersecurity object associated with the cybersecurity threat.

15. The system of claim 13, wherein the memory contains further instructions which when executed by the processing circuitry, further configures the system to:

detect a second remediation node connected to: the cybersecurity risk node, and the node representing the forensic finding.

16. The system of claim 15, wherein the memory contains further instructions which when executed by the processing circuitry, further configures the system to:

initiate a second remediation action.

17. The system of claim 11, wherein the memory contains further instructions which when executed by the processing circuitry, further configures the system to:

detect a second forensic node connected to the remediation node; and initiate an inspection of the inspectable disk based on the second forensic node to detect another forensic artifact.

18. The system of claim 11, wherein the remediation action is any one of: generating a notification, generating a ticket in a ticketing system, adding a rule to a policy, updating a rule to a policy, deleting a cryptographic key, removing a permission, revoking network access, sandboxing the resource associated with the disk, based on which the inspectable disk was generated, and any combination thereof.

19. The system of claim 11, wherein the forensic artifact is any one of: a file containing metadata, a file containing content of a deleted file, a cookie, a content extracted from a cache memory, a content extracted from a cache storage, website data, a disk image, a file attribute value, a record in a network log, a record in a cloud log, and any combination thereof.

* * * * *